US010664865B1

(12) United States Patent
Monaco

(10) Patent No.: US 10,664,865 B1
(45) Date of Patent: May 26, 2020

(54) TRANSACTIONAL MARKETING SYSTEM AND PROCESSES FOR GENERATING A MARKETING KIT

(71) Applicant: Michael Monaco, Los Angeles, CA (US)

(72) Inventor: Michael Monaco, Los Angeles, CA (US)

(*) Notice: Subject to any disclaimer, the term of this patent is extended or adjusted under 35 U.S.C. 154(b) by 1016 days.

(21) Appl. No.: 15/042,048

(22) Filed: Feb. 11, 2016

Related U.S. Application Data

(60) Provisional application No. 62/115,009, filed on Feb. 11, 2015.

(51) Int. Cl.
*G06Q 30/02* (2012.01)

(52) U.S. Cl.
CPC ..... *G06Q 30/0254* (2013.01); *G06Q 30/0276* (2013.01)

(58) Field of Classification Search
CPC ........... G06Q 30/0269; G06Q 30/0276; G06Q 30/0254
See application file for complete search history.

(56) References Cited

U.S. PATENT DOCUMENTS

| | | | |
|---|---|---|---|
| 5,576,951 A | 11/1996 | Lockwood | |
| 2002/0123912 A1* | 9/2002 | Subramanian | G06Q 10/02 705/5 |
| 2002/0123957 A1* | 9/2002 | Notarius | G06Q 30/06 705/37 |
| 2007/0050711 A1* | 3/2007 | Walker | G06Q 30/02 715/205 |
| 2007/0061242 A1* | 3/2007 | Ramer | G06Q 10/10 705/37 |
| 2007/0094042 A1* | 4/2007 | Ramer | G06Q 30/0243 705/1.1 |
| 2007/0233565 A1* | 10/2007 | Herzog | G06Q 30/02 705/14.41 |
| 2008/0059256 A1* | 3/2008 | Lynch | G06Q 10/063 705/7.24 |

(Continued)

OTHER PUBLICATIONS

Wilson, S.G. and Abel, I., 2002. So you want to get involved in e-commerce. Industrial Marketing Management, 31(2), pp. 85-94. (Year: 2002).*

(Continued)

*Primary Examiner* — David J Stoltenberg
*Assistant Examiner* — Robert C Johnson
(74) *Attorney, Agent, or Firm* — Plager Schack LLP; Mark H. Plager; Stephen Hallberg

(57) ABSTRACT

A marketing kit generation system and processes for generating a marketing kit and generating a book marketing kit are disclosed. The system and processes for marketing kit generation enhance a person's ability to independently market and sell a product or service, without having extensive knowledge about marketing or time to engage in marketing. The system and processes provide enhanced marketing ideas, suggestions, and strategies, and executes them on behalf of and at the direction of the person. The system and processes provide contacts, crafts communications, uploads marketing material automatically for sending of emails to contacts, and sends emails to contacts when direction by the person.

15 Claims, 6 Drawing Sheets

(56) References Cited

U.S. PATENT DOCUMENTS

| | | | |
|---|---|---|---|
| 2009/0112648 A1* | 4/2009 | Lee | G06Q 30/02 |
| | | | 705/7.32 |
| 2010/0017294 A1* | 1/2010 | Mancarella | G06Q 10/107 |
| | | | 705/14.55 |
| 2011/0145076 A1* | 6/2011 | Ramer | G06Q 30/02 |
| | | | 705/14.72 |
| 2012/0059706 A1* | 3/2012 | Goenka | G06Q 30/0242 |
| | | | 705/14.41 |
| 2014/0074627 A1* | 3/2014 | Kucharz | G06Q 30/02 |
| | | | 705/14.72 |
| 2015/0073912 A1 | 3/2015 | Brady | |
| 2016/0224320 A1* | 8/2016 | Jemiolo | G06Q 50/01 |

OTHER PUBLICATIONS

Marinova, A., Murphy, J. and Massey, B.L., 2002. Permission e-mail marketing as a means of targeted promotion. Cornell Hotel and Restaurant Administration Quarterly, 43(1), pp. 61-69. (Year: 2002).*

* cited by examiner

TRANSACTIONAL MARKETING SYSTEM AND PROCESSES FOR GENERATING A MARKETING KIT

CLAIM OF BENEFIT TO PRIOR APPLICATION

This application claims benefit to U.S. Provisional Patent Application 62/115,009, entitled "TRANSACTIONAL MARKETING SYSTEM THAT FINDS TARGET MARKETS, AUTOMATES A PRODUCT/SERVICE KIT, AND ELECTRONICALLY DELIVERS THE KIT TO SELECT VENUES," filed Feb. 11, 2015. The U.S. Provisional Patent Application 62/115,009 is incorporated herein by reference.

BACKGROUND

Embodiments of the invention described in this specification relate generally to automated target market and venue identification, and more particularly, to systems that help end users to identify target markets, generate promotional materials to send to entities in the target markets, and recommend specific venues to send the promotional materials.

Marketing a product or a service requires time, money, and expertise that many entities lack. Book marketing, in particular, requires enormous time, steady streams of ample funds, and a level of marketing expertise in the book industry which most authors do not have. Furthermore, authors do not know what materials to send to potential book buyers or how to find alternate venues such as a toy store that sells books. Moreover, designing and mailing out book kits is time consuming and expensive. This is problematic for entities trying to market a product or service, as well as for authors trying to promote a book.

Existing target marketing software only finds target markets, but fails to provide suggestions on how to market a product or service or recommend venues for who to market the product or service to. Also, existing target marketing software does not generate a marketing kit that gets electronically delivered to select venues.

Therefore, what is needed is a way to supplant years of industry and marketing experience to an entity (such as an author) in order to locate target markets, supply tips, and recommend venues (and alternate venues), provide contacts, think of marketing ideas and strategies, and craft communications, in order to effectively promote a product or a service, and to do so in a way that involves little to no learning curve and very little hands on interaction from the user and executes these actions automatically on behalf of the user.

BRIEF DESCRIPTION

Some embodiments of the invention include a process for generating a marketing kit, a process for generating a book marketing kit, a transactional marketing system, a transactional book marketing system, detailed processes for generating marketing kits with customized marketing information, a process for generating a premium marketing kit that includes market research, and an automated book kit creation process.

In some embodiments, the process for generating a marketing kit includes steps for receiving target demographics, generating a marketing message, identifying target markets, identifying venues in each target market, filtering the identified venues to derive recommended venues, generating custom email which includes the marketing message, and generating a marketing kit with the identified target markets and recommended venues and which can be triggered to automatically send the custom email to contacts at the recommended venues. In some embodiments, the process for generating a marketing kit is an automated book kit creation process.

In some embodiments, the transactional marketing system identifies target markets suitable for a user to market a product or service, automatically creates a marketing kit to use in marketing the product or service, and delivers the marketing kit to contacts/venues, according to the direction and control of the user. In some embodiments, the transactional marketing system supplies tips and recommends a set of venues for promoting a product or service. In some embodiments, the transactional marketing system recommends a set of alternate venues for promoting a product or service. In some embodiments, the transactional marketing system generates custom marketing materials and sends the custom marketing materials to identified contacts at target venues, at the complete direction and control of the user. In some embodiments, the transactional marketing system generates custom marketing materials by researching features of the product or service to be promoted and highlighting key aspects of the research that are illuminate advantages, improvements, prospects, or other details which distinguish the product or service from competing products or services.

In at least one embodiment, the transactional marketing system is a transactional book marketing system that identifies target markets suitable for a book of an author or book promoter, assembles a book marketing kit, identifies venues for promoting the book, and generates contact communications to introduce and promote the book. In some embodiments, the transactional book marketing system identifies target markets by finding markets with large populations of book consumers within a demographic group specified by the author or promoter. In some embodiments, the transactional book marketing system assembles the book marketing kit automatically. In some embodiments, the transactional book marketing system generates the contact communications before sending or emailing the communications and/or book marketing kit to contacts at the select venues, leaving direction and control over the communications to the author or promoter.

In some embodiments, the process for generating a marketing kit identifies target markets by at least one of user input of market identifying information and analysis of the received target demographics information in light of the product or service. In at least one embodiment, a detailed process for requesting market recommendations and generating a marketing kit includes steps for determining whether market recommendations have been requested. The detailed process for requesting market recommendations and generating a marketing kit includes steps for receiving information about a product or service a user intends to market, receiving target demographics information related to the product or the service, determining whether market recommendations have been requested, identifying target markets, identifying venues in each target market, filtering the identified venues to derive recommended venues, generating a marketing message that highlights the product or service information and is customized based on the target demographics information, and generating a marketing kit with information about the target markets and the recommended venues and an email message with the marketing message to be sent automatically to contacts at the venues.

In some embodiments, the detailed process for requesting market recommendations and generating a marketing kit includes further steps depending on the determination as to whether market recommendations have been requested. When the determination is negative and no request for market recommendations was made, the detailed process for requesting market recommendations and generating a marketing kit includes steps for receiving user input to identify the target markets and, based on the user input, identifying the target markets. When the determination is positive and a request for market recommendations was affirmatively made, the detailed process for requesting market recommendations and generating a marketing kit includes a step for identifying target markets likely to have a large population of people that match the target demographics information.

In some embodiments, a process for generating a marketing kit with marketing suggestions tailored to target markets and venues includes steps for receiving biographical information about a user with a product or service to be marketed, receiving detailed information about the product or service, receiving target demographics related to the product or service, generating a marketing message based on all the received information, identifying target markets based on the target demographics, identifying venues in each target market, filtering the identified venues to derive recommended venues, generating market suggestions tailored to each target market and each recommended venue, searching for contacts associated with each recommended venue or target market, generating custom communications which include the marketing message, generating a marketing kit with the identified target markets, the recommended venues, the marketing suggestions, and the contacts at the recommended venues, and automatically sending the custom communications to the contacts at the recommended venues.

In some embodiments, a premium process for generating a premium marketing kit that includes market research in the premium marketing kit includes steps for receiving target demographics, generating a marketing message, identifying target markets based on the target demographics, identifying venues in each target market, filtering the identified venues to derive recommended venues, compiling a list of features related to a product or service to be marketed, generating a survey to send to a list of key contacts, receiving survey responses from one or more of the key contacts, incorporating survey responses into a marketing message for promoting the product or service, searching web resources for relevant research information pertaining to the product or service, parsing the relevant research information to find key points that may help sell the product or service, generating a relevant research report with the key points highlighted, generating a custom email message with the marketing message, the list of features, the key points, and additional customized information, generating a marketing kit with the identified target markets, the recommended venues, the marketing suggestions, and the contacts at the recommended venues, and automatically sending the custom email message to the contacts at the recommended venues.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
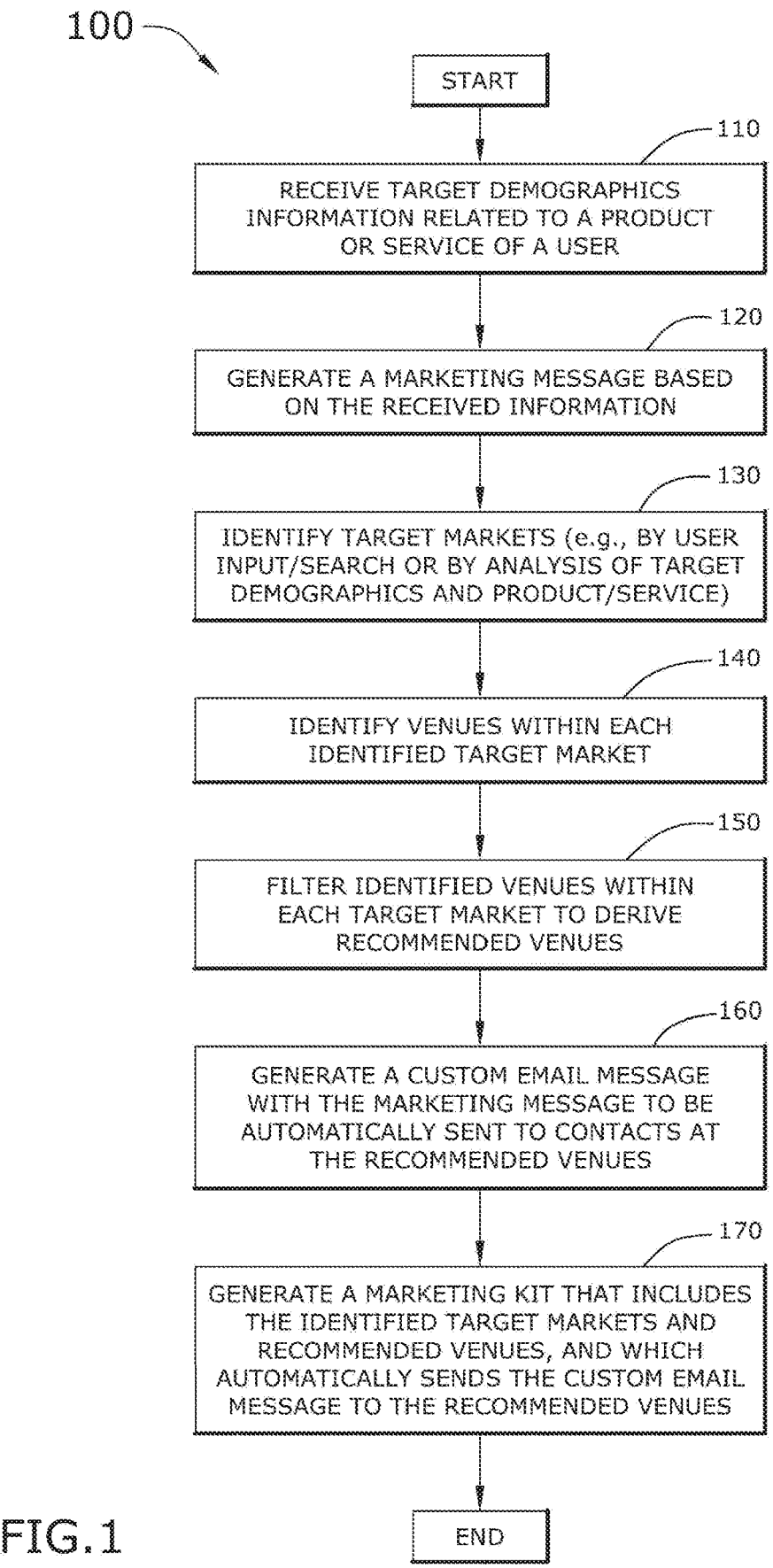
FIG. 1 conceptually illustrates a process for generating a marketing kit in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel transactional marketing system and novel processes for generating a marketing kit. In some embodiments, the transactional marketing system identifies target markets suitable for a user to market a product or service, automatically creates a marketing kit to use in marketing the product or service, and delivers the marketing kit to contacts/venues, according to the direction and control of the user. In some embodiments, the process for generating a marketing kit is an automated book kit creation process.

As stated above, marketing (in general) and book marketing (in particular) requires time, money and expertise that many people or entities intending to market products or services, or many authors or book promoters lack. Furthermore, it is not always clear what materials to send to potential buyers or how to find alternate venues. A person or user (hereinafter, person is referred to as a "user") is left pondering intricate market dynamics and digging for contacts to communicate with in trying to market a product or service.

In this specification, a promoter is a person or entity with an interest in a product or service. A promoter may be a person, a group of people working in concert, an informal entity (such as a club or association of people), or a formal legal entity (such as a business). A promoter may have legal rights in relation to a product or service. In particular, a promoter may have a legal right to manufacture and/or sell a product invented, created, or otherwise owned by another, or a legal right to market and/or provide a service. For instance, a promoter may be a person who has copyright and exclusive distribution rights for a book written by someone else (e.g., an author who may have sold or licensed the rights to the promoter).

Added to these problems is the fact that designing and mailing out promotional material kits (e.g., book kits) may be intensive, time consuming, and expensive. Embodiments of the transactional marketing system and the processes for generating a marketing kit described in this specification solve such problems by (i) analyzing features of a product or service to be marketed by a user, (ii) identifying venues and contacts within specified target demographics, geographically, socially, and based on market realities, (iii) automatically generating a marketing kit to effectively promote the product (e.g., a book written by the user) or the service according to specified demographics of target audiences/consumers/readers, and (iv) creating marketing message communications which are in the complete power of the user to send to one or more of the identified contacts/venues.

While the transactional marketing system and processes automate much of the time-consuming and detailed work of identifying markets, assembling marketing kits, and finding venues, the user retains direction and control over when a marketing message (e.g., email) of a marketing kit gets sent to a contact or venue. This allows the user to easily find contacts within markets that are suitable for marketing the user's product or service, and without relinquishing the user's control over the marketing of the product or service.

By way of example, FIG. 1 conceptually illustrates a process for generating a marketing kit 100. The process for generating a marketing kit 100 may be implemented as a software application which when running on a processor of a computing device provides a marketing kit generation web service that allows a user of a client computing device to request creation of a marketing kit related to a product or a service that the user intends to market. For instance, the user may be an author who intends to promote and market a book, but does not have sufficient time or knowledge to conduct marketing preparation work, and therefore, wishes to have a customized marketing kit generated for his or her use in marketing and promoting the book.

The process for generating a marketing kit 100 starts when the user requests generation of a marketing kit. The process 100 first receives (at 110) target demographics information related to the product or the service the user intends to market. For example, the user may select an age range associated with young adult readers who may be interested in reading the author's book. Once the process 100 has the target demographics and information about the product or service (e.g., the book), the process 100 then generates (at 120) a marketing message based on the received information. The marketing message may include just basic information about the product or service, and may present the information in a manner considered suitable for the target demographic specified by the user.

Next, the process for generating the marketing kit 100 identifies (at 130) target markets. In some embodiments, the user inputs information which identifies one or more target markets. For instance, the user may enter a city, state, or zip code to get things started, or the user may search through a list of large metropolitan markets and select one or more markets which the user believes are feasible for the scope of marketing the user intends to conduct. Alternatively, or in conjunction with user-selected target markets, the system may automatically search for target markets based on the specified target demographics and/or the product or service.

After the target markets are identified, the process 100 identifies (at 140) venues within each target market. For example, there may be several book stores in an identified target market in which to market a book. Next, the process 100 filters (at 150) the identified venues within each target market to derive recommended venues. For example, an author who intends to market a book that deals with adult issues may exclude book stores that are geared for young children.

With the recommended venues derived, the process for generating the marketing kit 100 of some embodiments generates (at 160) a custom email message with the marketing message to be automatically sent to contacts at the recommended venues. For example, the custom email message may be personalized according to the first and last names of a contact, so as to reach out to a contact in a more personalized manner. Additional custom information may be included in the email message, including details about the author, details about the subject matter of a book, details about the usefulness of a product or value of a service, etc.

Finally, the process for generating the marketing kit 100 generates (at 170) a marketing kit that includes the identified target markets and recommended venues, and which is able to be automatically triggered to send the custom email message to the contacts and the recommended venues. The process 100 then ends.

In some embodiments, the process for generating a marketing kit 100 is an automated book kit creation process. The automated book kit creation process of some embodiments analyzes book features and target demographics, thereby allowing authors to easily find their target markets. The book features may include, for example, the book's main character and the book's storyline. In some embodiments, the automated book kit creation process also automates the process of finding venues. Thus, the automated book kit creation process makes it easy for anyone to produce a custom kit and automatically find venues.

In this specification, there are several descriptions of processes and methods that are performed by software running on a traditional computing device (e.g., computer, laptop, server, etc.) and/or on a user's mobile device (e.g., smartphone) in order for a user to interact with the transaction marketing system to generate a marketing kit. However, it should be noted that for the purposes of the embodiments described in this specification, the word "method" is used interchangeably with the word "process". Methods are described, therefore, by reference to example processes that conceptually illustrate process steps for generating a marketing kit, generating a premium marketing kit that includes market research, and/or generating a book marketing kit.

Several more detailed embodiments are described below. Section I describes a transactional marketing system that identifies target markets suitable for a user to market a product or service, automatically creates a marketing kit to use in marketing the product or service, and delivers the marketing kit to contacts/venues, according to the direction and control of the user. Section II describes some detailed processes for generating marketing kits. Section III describes a process for generating a premium marketing kit that includes market research in the premium marketing kit. Lastly, Section IV describes an electronic system that implements some embodiments of the invention.

I. Transactional Marketing System

As noted above, the transactional marketing system of some embodiments identifies target markets suitable for a product or service that a user intends to market, automates the creation of a marketing kit in relation to the product or service, and electronically delivers the marketing kit to contacts in select venues, according to the direction and control of the user. In some embodiments, the transaction marketing system supplies tips and recommends a set of venues for promoting a product or service. In some embodiments, the transactional marketing system recommends a set of alternate venues for promoting a product or service. Additionally, the transactional marketing system in some embodiments generates custom marketing materials and sends the custom marketing materials to target venues and/or identified contacts, at the direction and control of the user. In some embodiments, the transactional marketing system generates custom marketing materials by researching features of the product or service to be promoted and highlighting key aspects of the research that are illuminate advantages, improvements, prospects, or other details which distinguish the product or service from competing products or services.

In at least one embodiment, the transactional marketing system is a transactional book marketing system that identifies target markets suitable for a book of an author or book promoter, assembles a book marketing kit, identifies venues for promoting the book, and generates contact communications to introduce and promote the book. In some embodiments, the transactional book marketing system identifies target markets by finding markets with a large populations of book consumers within a demographic group specified by the author or promoter. In some embodiments, the transactional book marketing system assembles the book marketing kit automatically. In some embodiments, the transactional book marketing system generates the contact communications before sending or emailing the communications and/or book marketing kit to contacts at the select venues. The transactional book marketing system leaves direction and control to the author or promoter over which contacts and venues to communicate with in promoting the book. Thus, although the transactional book marketing system automates much of the time-consuming and detailed work for identifying a target market, assembling a book kit, and finding venues, the author has final say about when marketing messages in the book marketing kit get sent, and which venues will be sent emails with the marketing messages and other such book details.

Embodiments of the transactional marketing system described in this specification differ from and improve upon currently existing options. In particular, some embodiments of the transactional marketing system differ because the system of the present disclosure is completely transactional and can be applied to any industry. For instance, in some embodiments, the transactional marketing system is a transactional book marketing system that identifies target markets suitable for a book of an author or book promoter, assembles a book marketing kit, identifies venues for promoting the book, and generates contact communications to introduce and promote the book. In some embodiments, the transactional book marketing system identifies target markets by finding markets with a large populations of book consumers within a demographic group specified by the author or promoter. In some embodiments, the transactional book marketing system assembles the book marketing kit automatically. In some embodiments, the transactional book marketing system generates the contact communications before sending or emailing the communications and/or book marketing kit to contacts at the select venues. The transactional book marketing system leaves direction and control to the author or promoter over which contacts and venues to communicate with in promoting the book. Thus, although the transactional book marketing system automates much of the time-consuming and detailed work for identifying a target market, assembling a book kit, and finding venues, the author has final say about when marketing messages in the book marketing kit get sent, and which venues will be sent emails with the marketing messages and other such book details.

In addition to improvements over existing options, the transactional marketing system improves upon the currently existing options because the existing target market software applications rely on the user to have a lot of industry and/or marketing experience. However, while the existing software applications help users to find target markets, typically those same users do not know what to send or how to go about getting their product in the right hands. In contrast, the transactional marketing system of the present specification not only locates target markets, but also supplies tips and venues (including alternate venues), basically supplanting years of industry and marketing experience to the user. Also, the transactional marketing system of some embodiments generates custom marketing materials and sends those materials out for the user.

For example, a book marketing kit may be generated as a PDF document and may include text and images from the actual book, biographical information about the author, pictures of the author, related news about the author, trends in the book industry which promote an aspect of the book being marketed, etc. Thus, the transactional book marketing system makes it possible for an author or promoter of the book to independently market the book, without having to do so much of the rigorous detailed marketing work normally associated with broadly marketing a book across multiple target markets. Simply put, the transactional marketing system helps people and entities to literally market a product or a service at the touch of a button.

Figure 2:
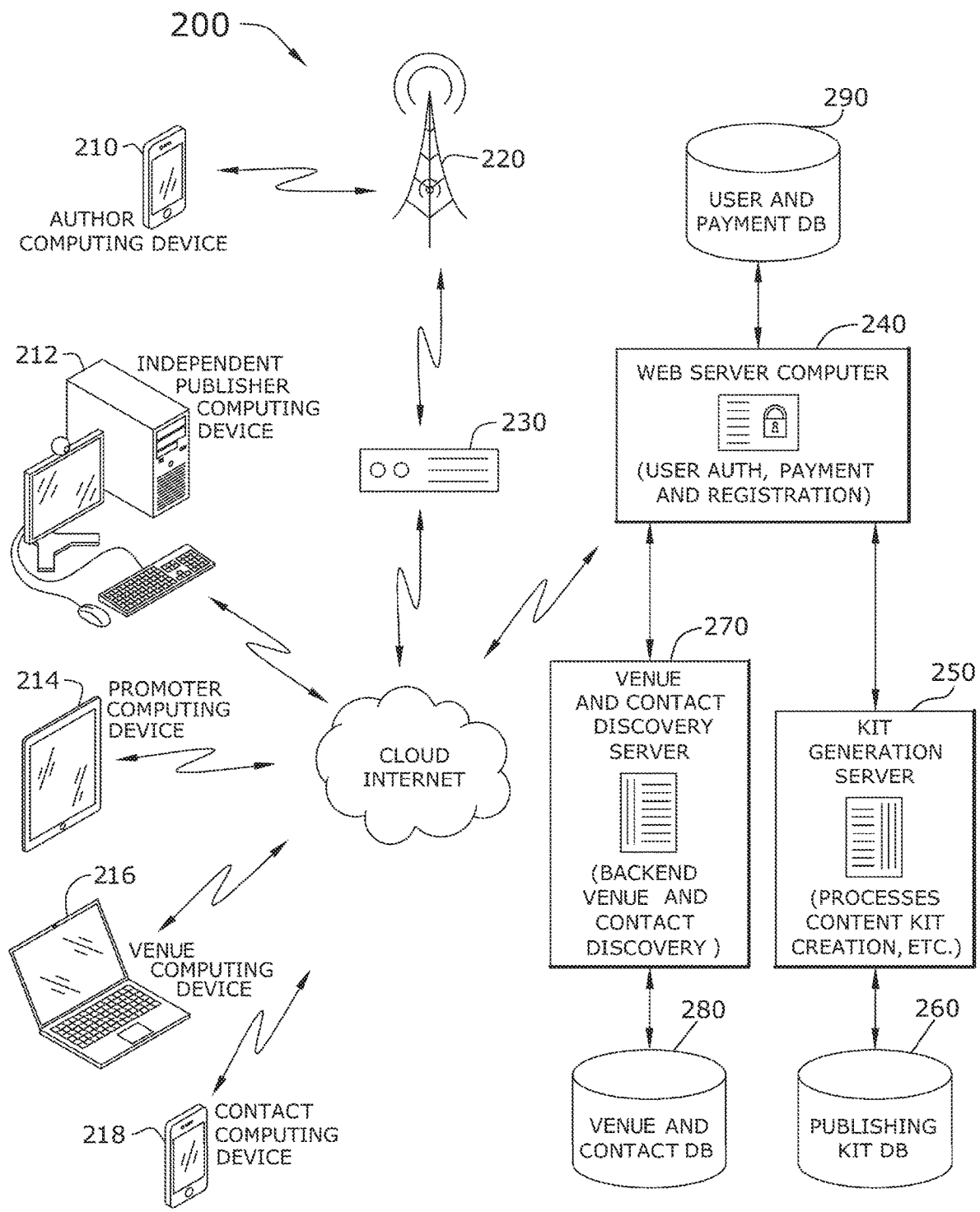
FIG. 2 conceptually illustrates a transactional marketing system in some embodiments.

By way of example, FIG. 2 conceptually illustrates a transactional marketing system 200. The transactional marketing system 200 shown in this figure may be a transactional book marketing system that identifies target markets in which an author, an independent publisher, or a promoter intends to market a book, automates the creation of a book marketing kit, and electronically delivers the book marketing kit to contacts at select venues, but only at the direction and control of the author, publisher, or promoter of the book. As shown in this figure, the transactional book marketing system 200 includes author/independent publisher/promoter computing devices 210, 212, and 214, and venue/contact computing devices 216 and 218. The transactional book marketing system 200 also includes a wireless communication point 220 (e.g., a cell tower for cellular data communication), a gateway 230, a web server 240, a marketing kit creation server 250, a marketing kit content database 260, a venue discovery and contact retrieval server 270, a venue and contact database 280, and a user registration and payment database 290.

The transactional book marketing system 200 generally works by user initiative, for instance, when an author has completed a book he or she intends to market, but who seeks to obtain book marketing materials and guidance which traditionally was only available from actual book marketing professionals with years of experience in the market. While an author may initiate contact with the transactional book marketing system 200 to obtain such book marketing materials, the following interaction between a user (an author, an independent publisher, or a promoter of a book) and the transactional book marketing system 200 illustrates an example of how the user may do so. This list of possible interactions and actions is intended to be exemplary only and it is not intended that this list be used to limit the transactional book marketing system 200 of this example or the transactional marketing system of the present application to just these interactions and actions. Persons having ordinary skill in the relevant art may understand there to be equivalent interactions or actions that may be substituted within the present disclosure without changing the essential function of the transactional marketing system.

First, a user accesses the transactional book marketing system 200 by using one of the author/independent publisher/promoter computing devices 210, 212, or 214 to connect to the web server 240. In some embodiments, the web server 240 performs authentication, registration, and payment functions, such that the user either logs into the transactional book marketing system 200 or, if not yet registered, registers for an account in the transactional book marketing system 200. If the user logs in as a previously registered user, the web server 240 performs authentication operations in relation to credentials of the user. For instance, a username and a password input by the user may be validated by searching the user registration and payment database for matching username and password combinations. If the web server 240 cannot validate the username and password, the web server 240 denies access to back-end processes of the transactional book marketing system 200. However, the user may attempt to log into the system again, as needed.

On the other hand, if the user is new (i.e., unregistered), he or she may register by entering a username and a password. The web server 240 then checks the user registration and payment database 290 to determine if the username and password combination is unique. When unique, the web server 240 stores the new user registration information (e.g., username and password) in the user registration and payment database 290.

In some embodiments, the web server 240 transmits a user interface (UI) to the computing device of the user after successfully logging into the transactional book marketing system 200. When displayed on a display screen of the user's computing device, the UI provides a way for the user to interact with the transactional book marketing system 200. In some embodiments, the UI includes a page of questions posed to the user. In some embodiments, the page of questions includes questions about target demographics, the book's storyline, and the book's main character, among other information that may be used to generate a book marketing kit for the user.

In some embodiments, the user can only obtain a book marketing kit upon payment for generation of the book marketing kit. In some embodiments, the user provides payment after successfully logging into the transactional book marketing system 200. In some other embodiments, the user provides payment after providing answers to the page of questions on the UI. Whenever such payment is made, the web server 240 performs one or more payment processing operations and if payment is accepted, the web server 240 stores payment information in the user registration and payment database 290.

When the UI is displayed on the computing device of the user, the questions posed to the user include fields or selectable tools that allow the user to answer the questions or provide the requested information. For example, the UI may include text fields in which the user may input the book's main character and the book's storyline, the biographical information about the author, and/or other such book-related information. Text fields are only one example of a UI tool which may be utilized to receive user-provided biographical information, and/or information about a product or service, or other related content. In many cases, the user may wish to include a variety of personal, professional, and newsworthy information, and may provide text and non-text content to expose such information. For example, the user may intend to market a service and provide biographical information which highlights details about the user as a service provider, and may include non-textual content, such as images and/or videos, as well as other information about the user or the service being provided by the user.

The user may also input demographics information, or may utilize one or more UI tools to make target demographics selections. For instance, the UI may include a drop-down box that allows the user to select one or more target demographics entries. Other UI designs and interface tools or elements for interacting with the transactional book marketing system 200 may be included, as a person skilled in the relevant art would appreciate.

In some embodiments, the UI displayed on the computing device of the user further includes a page of questions pertaining to the personal life and professional experience of the author. In some embodiments, the UI further includes fields for open-ended user input pertaining to the author's own biography and further description of the book. Here, the user may input a book description which is different from the storyline but summarizes aspects of the book, the author, and/or the intended readership demographic. For instance, a description of a main character or the storyline of the book may be tied to a particular aspect of the author's biography or may relate to the author's motivation for writing the book.

In some embodiments, the computing device 210, 212, or 214 of the user transmits the user input back to the web server 240. When received, the web server 240 redirects the received user input data (i.e., the answers to the questions displayed in the UI) to the book marketing kit generation server 250 for processing, formatting, and inclusion in the book marketing kit to be created. The book marketing kit generation server 250 may generate the book marketing kit in any of several manners appropriate for an intended audience, whether the intended audience includes key contacts at specific venues or intended readership of the book. In some embodiments, one or more templates are stored in the book marketing kit database 260. The templates may relate to the intended recipients or readers, for example, a child readership template may lay out the answers to the questions in a format suitable for a children bookstore or section of a bookstore intended for children, while a technical documentation template may lay out the answers to the questions in a different format more suitable for technically-minded readers.

Contemporaneously with laying out the answers to the questions in a suitable format, in some embodiments, the book marketing kit generation server 250 transmits a query to a venue contact discovery and retrieval server 270 to search for book stores and venues in target markets specified in answers to the questions. In some embodiments, the venue contact discovery and retrieval server 270 analyzes the target markets specified by the user and searches for venues and contacts in the target markets, according to the specified demographic information. In some embodiments, the venue contact discovery and retrieval server 270 searches a venue and contact database 280 for venues and contacts that meet the requested needs. In some embodiments, the venue contact discovery and retrieval server 270 further searches cloud-network resources for venues and contacts related to the target markets. In some embodiments, the venue contact discovery and retrieval server 270 expands on the requested venue and contact details by searching for related target markets which the user may not have indicated. In some embodiments, such expanded venue/contact information can be provided to the user in the book marketing kit. The results of the search performed by the venue contact discovery and retrieval server 270 are then transmitted back to the book marketing kit generation server 250 for inclusion in the book marketing kit.

After processing and formatting are completed by the book marketing kit generation server 250 and the search results are received from the venue contact discovery and retrieval server 270, the book marketing kit generation server 250 generates the book marketing kit. In some embodiments, the book marketing kit is generated by the book marketing kit generation server 250 with the discovered venues and contacts from the venue contact discovery and retrieval server 270, the author's biography, the description of the book, a book cover (if provided as an image, or as generated), and a letter from a third party introducing the book to contacts at the venues. In some embodiments, the book marketing kit is automatically generated and transferred into a PDF format for electronic distribution to the contacts and venues in the target markets. In some embodiments, the book marketing kit generation server 250 then stores the generated book marketing kit in the book marketing kit database 260.

The book marketing kit generation server 250 of some embodiments then sends the book marketing kit to the computing device 210, 212, or 214 of the user. Once received, the user searches through the venues, the bookstores, and the contacts in the book marketing kit. The user may then select venues, bookstores, and contacts to which to send the customized book marketing kit. In some embodiments, the book marketing kit is transmitted to the computing device of the user with another user interface (UI) that allows the user to quickly select the venues, bookstores, and/or contacts to which to send the book marketing kit. For example, the UI may include a list of the contacts, the venues, and/or the bookstores with check boxes for selection of each contact, venue, and/or bookstore the user intends to send the book marketing kit. The UI may also include a UI button to send the book marketing kit to the checked contacts, venues, and/or bookstores, and may then transmit the book marketing kit via email to computing devices 216 and 218 of the selected contacts and venues.

It is noted that although the example transactional book marketing system 200 described by reference to FIG. 2 includes certain types of example computing devices associated with authors, independent publishers, and/or promoters and other types of example computing devices associated with venues and/or contacts, a person skilled in the relevant art would appreciate that any author, independent publisher, promoter, contact, venue, bookstore, or other user may interact with the a transactional marketing system or transaction book marketing system using any computing device that is configured with a network communication hardware device (e.g., a network adapter, a WiFi wireless network adapter, a cellular network SIM card, etc.) which enables network communication with one or more server computing devices of a cloud-network service provider.

To make the transactional marketing system 200, a person may perform data collection and data warehousing, which can either be publicly available like census data, or provided by the user, such as details about their sales history etc. Then, once data is collected/warehoused, a number of methods can be used to analyze it. For example, an algorithm that automatically analyzes age, race, education level, income level, price range, marital status, whether people have kids or not, etc., can be employed. In some cases, predictive statistics like linear regression and descriptive statistics are used to arrive at actionable insights.

The users of the transactional book marketing system 200 of FIG. 2 include authors, independent publishers, and/or promoters for whom book marketing kits are created, as well as contacts and/or venues to whom book marketing kits may be sent to promote or sell a book. However, for purposes of this specification, a user may be any person, entity, partnership, informal group, formal group, association, etc., who has a legal right to promote, distribute, and/or sell a product or a service, or who is authorized to provide marketing materials in furtherance of the promotion, distribution, and/or sale of the product or the service. Thus, a person skilled in the relevant art would appreciate that users of the transactional marketing system and/or the transactional book marketing system are not intended to be limited to authors and promoters or contacts and venues. Broader examples of users would therefore include people promoting or selling other content-related products besides books, as well as people offering services in relation to any of several written content formats (e.g., editors of books, reviewers of written works, etc.) or in relation to other services that may be marketed to target demographic groups via service package kits delivered to providers, outlets, or other interested parties to market the service.

The example transactional book marketing system 200 described by reference to FIG. 2 demonstrates how an author, an independent publisher, or a promoter of a book may obtain a book marketing kit with virtually no knowledge of the market, venues, or contacts in the field. Furthermore, although the transactional book marketing system 200 pertains to marketing a book, a person skilled in the relevant art can appreciate how the system can be adapted for use in other fields to support the generation of marketing kits for other products or services. In the next section, some processes are described for generating marketing kits.

II. Processes for Generating a Marketing Kit

The process for generating a marketing kit 100 described by reference to FIG. 1 above includes several high level steps which occur when a user interacts with the marketing kit generation system 200 described by reference to FIG. 2, also above. In some embodiments, the process for generating a marketing kit identifies target markets by at least one of user input of market identifying information and analysis of the received target demographics information in light of the product or service.

In at least one embodiment, a detailed process for requesting market recommendations and generating a marketing kit includes steps for determining whether market recommendations have been requested. The detailed process for requesting market recommendations and generating a marketing kit includes steps for receiving information about a product or service a user intends to market, receiving target demographics information related to the product or the service, determining whether market recommendations have been requested, identifying target markets, identifying venues in each target market, filtering the identified venues to derive recommended venues, generating a marketing message that highlights the product or service information and is customized based on the target demographics information, and generating a marketing kit with information about the target markets and the recommended venues and an email message with the marketing message to be sent automatically to contacts at the venues.

In some embodiments, the detailed process for requesting market recommendations and generating a marketing kit includes further steps depending on the determination as to whether market recommendations have been requested. When the determination is negative and no request for market recommendations was made, the detailed process for requesting market recommendations and generating a marketing kit includes steps for receiving user input to identify the target markets and, based on the user input, identifying the target markets. When the determination is positive and a request for market recommendations was affirmatively made, the detailed process for requesting market recommendations and generating a marketing kit includes a step for identifying target markets likely to have a large population of people that match the target demographics information.

Figure 3:
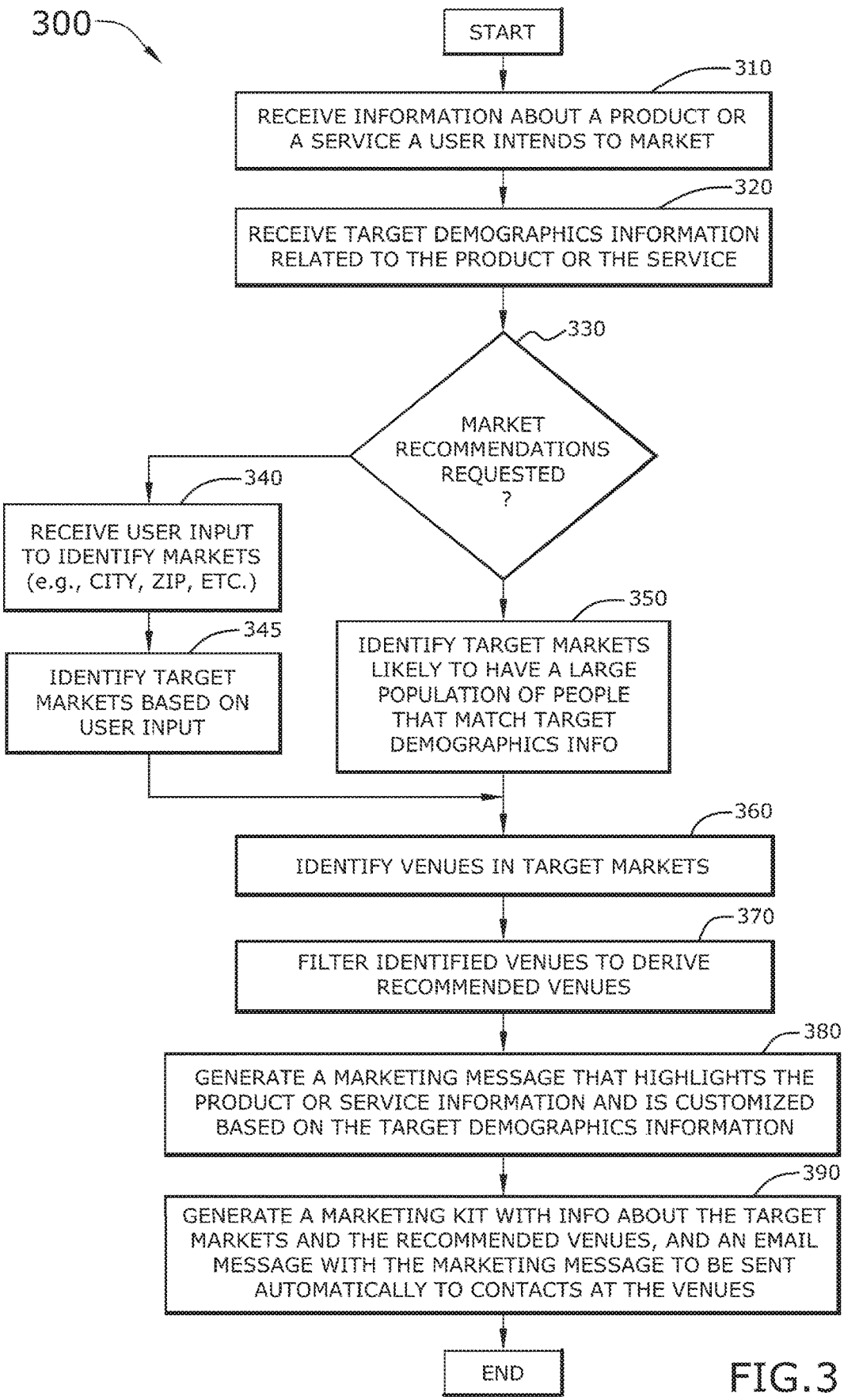
FIG. 3 conceptually illustrates a detailed process for requesting market recommendations and generating a marketing kit in some embodiments.

By way of example, FIG. 3 conceptually illustrates a detailed process for requesting market recommendations and generating a marketing kit 300. The detailed process for requesting market recommendations and generating a marketing kit 300 may be implemented as a software application which when running on a processor of a computing device provides a marketing kit generation web service that allows a user of a client computing device to request target market recommendations and generation of a marketing kit.

In some embodiments, the process for requesting market recommendations and generating a marketing kit 300 starts when the user connects the service and requests generation of a marketing kit. In some embodiments, the process for requesting market recommendations and generating a marketing kit 300 receives (at 310) information about a product or service the user intends to market. As noted above, by reference to FIG. 1, a user may input details about a product or service to be marketed. For example, the user may be a representative of a start-up company with a new line of beverages to market, so the representative may input details about the beverage(s). Next, the process 300 receives (at 320) target demographics information related to the product or the service. The manner of specifying target demographics may include direct user input, selection from demographic categories (already broken down and presented to the user in the UI by way of, for example, a drop down list or a selection box with a scroll bar, etc.).

Next, the process for requesting market recommendations and generating a marketing kit 300 determines (at 330) whether market recommendations have been requested. In some embodiments, a request for market recommendations is triggered by a user selection of a graphical user interface tool, at which time the process automatically recommends markets. This is described in further detail below. On the other hand, some users know which markets they intend to market a product or a service. When no market recommendations are requested, the process 300 receives (at 340) user input to identify the markets. For example, the user may input a city name, a zip code, a region, or the user may search for particular markets on their own, or by reviewing information provided by the system in relation to markets, etc. The process 300 then identifies (at 345) the target markets based on the user input.

Referring back to the determination of whether market recommendations have been requested, when the process 300 determines (at 330) that market recommendations have been requested affirmatively, then the process 300 identifies (at 350) target markets likely to have a large population of people that match target demographics information in relation to the product or service. For instance, the user may select an option to receive market recommendations in which case the process 300 automatically recommends markets to the user. In these embodiments, the process analyzes the product or service information provided by the user as well as the target demographics to identify markets with sizable populations of people who match the target demographics and who may be interested in the product or service. In some embodiments, target markets are found by taking the answers to the questions about the product or service, as well as the demographics information. In some embodiments, markets are searched for throughout a particular region or country, such as the United States or other countries, to find cities with the largest population of the user's target demographic. In some embodiments, the search is based on one or more of age, race, marital status, education, and income level. In some embodiments, a linear regression search is performed. In some embodiments, a naive bayes search is performed. In some embodiments, another analytical method is performed to search for and arrive at a target audience.

After identifying the target markets, the process 300 identifies (at 360) venues in the target markets, and thereafter filters (at 370) the identified venues to derive a set of recommended venues. For example, a target market may include over 50 book stores, but the user may have specified a specific demographic group that results in the number of book stores (venues) to be reduced to only 15 recommended book stores.

In some embodiments, the process for requesting market recommendations and generating a marketing kit 300 then generates (at 380) a marketing message that highlights the product or service information and is customized based on the target demographics information. Finally, the process 300 generates (at 390) a marketing kit with information about the target markets and the recommended venues, and also generates an email message with the marketing message included in the body of the email. In some embodiments, the process 300 waits to send the email to each contact/venue, specifically allowing the user to direct the control and timing of messaging and communication with the contacts/venues. Ultimately, the user retains final control over whether and when each email message is sent to contacts/venues. The process 300 then ends.

In another embodiment, a process for generating a marketing kit with marketing suggestions tailored to target markets and venues includes steps for receiving biographical information about a user with a product or service to be marketed, receiving detailed information about the product or service, receiving target demographics related to the product or service, generating a marketing message based on all the received information, identifying target markets based on the target demographics, identifying venues in each target market, filtering the identified venues to derive recommended venues, generating market suggestions tailored to each target market and each recommended venue, searching for contacts associated with each recommended venue or target market, generating custom communications which include the marketing message, generating a marketing kit with the identified target markets, the recommended venues, the marketing suggestions, and the contacts at the recommended venues, and automatically sending the custom communications to the contacts at the recommended venues.

Figure 4:
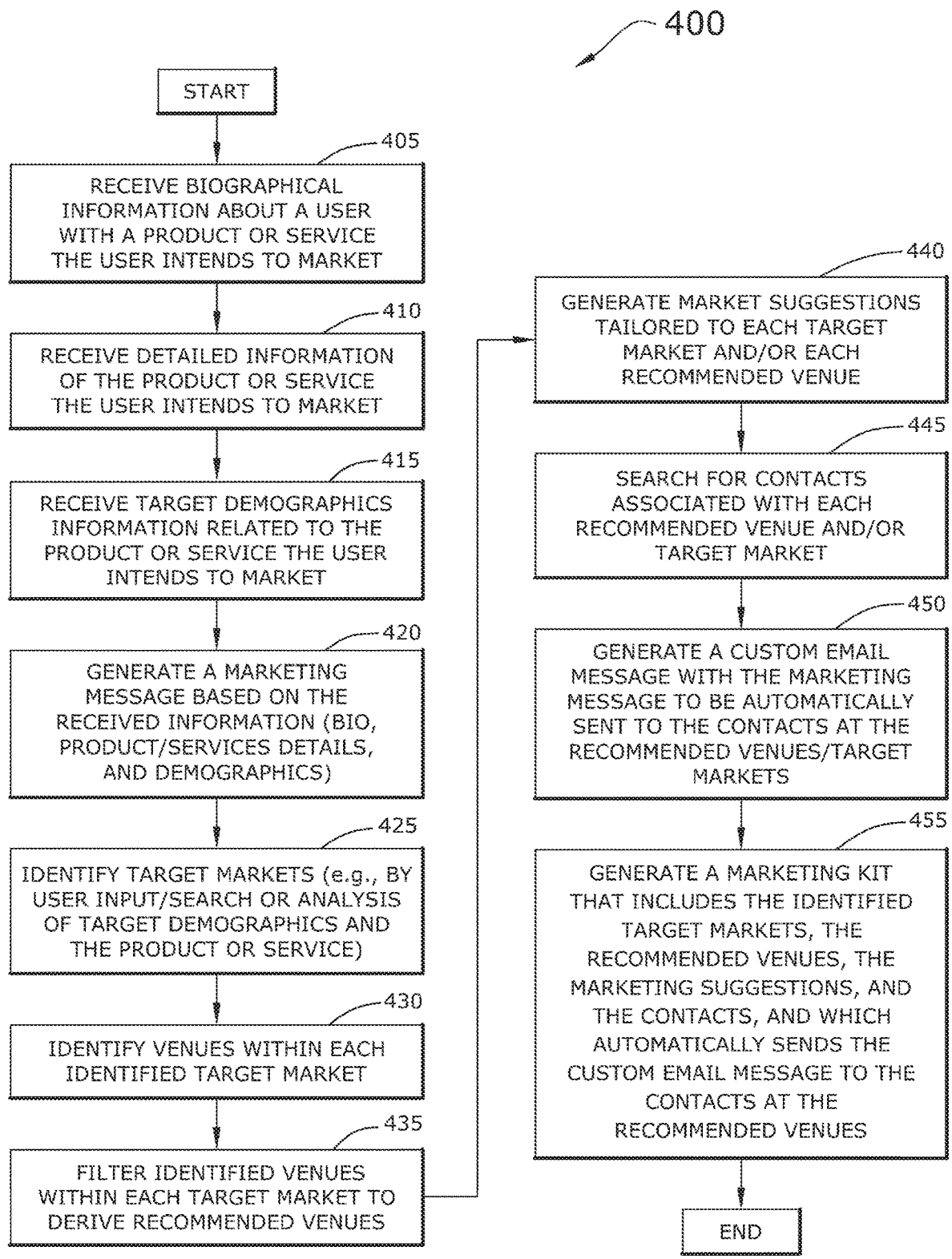
FIG. 4 conceptually illustrates a process for generating a marketing kit with marketing suggestions tailored to target markets and venues in some embodiments.

By way of example, FIG. 4 conceptually illustrates a process for generating a marketing kit with marketing suggestions tailored to target markets and venues 400. Similar to the previous processes described above, the process for generating a marketing kit with marketing suggestions tailored to target markets and venues 400 may be implemented as a software application. For example, the software application may be a program that provides a web service for generating a marketing kit with marketing suggestions tailored to target markets when it is running on a processor of a server computer accessible through a web server. The web service may be provided by way of a system that is designed and implemented with a software as a service architecture (SaaS), such as the transactional marketing system 200 described above by reference to FIG. 2.

In some embodiments, the process for generating a marketing kit with marketing suggestions tailored to target markets and venues 400 starts when a computing device of a user connects to the service and logs in or registers as a new user. In association with using the service, the user would likely have a product or service to market. For example, the user may be an author with a book to market and a mobile computing device, such as computing device 210, to make a connection to the service and begin interacting with the system. Alternatively, the user could be a promoter of a product or service who uses a tablet computing device, such as computing device 214, or the user may be a person with any kind of computing device that can make a connection to a cloud service, such as by making a connection to the web server computer 240.

Once connected, the process 400 of some embodiments receives (at 405) biographical information about the user, receives (at 410) detailed information about the product or service the user intends to market, and receives (at 415) target demographics information related to the product or service. The process 400 then generates (at 420) a marketing message based on the received information, which includes the biographical information about the user, the detailed product or service information, etc. While the steps for receiving the information is shown here in a particular sequence, a person skilled in the relevant art would appreciate that receiving such information may be handled in any order, or in not discernible order at all, but rather, by simultaneously posting questions for the user to answer according to the user's own whims. Thus, for example, the process 400 may display questions all at once, or according to user direction, or an another order, but ultimately, the process 400 prompts the user to provide one or more of the requested biographical information, the detailed information about the product or service to market, and the target demographics information.

After the user answers the questions and provides the information, the process 400 of some embodiments identifies (at 425) the target markets. In some embodiments, one or more analytical methods are used to analyze data to find what cities, venues or industries contain potential target customers for the user. However, as explained above by reference to FIG. 3, the target markets may be identified based on direct user input of specific, known markets in which the user intends to market the product or service or by analysis of the target demographics, product/service information, and other details. It is also possible that the target markets are identified by the process performing an analysis of the demographics (automatically providing target markets to the user) and the user providing one or more specific target markets, which are known by the user and in which the user already has decided to market the product or service in. In this way, the user has complete control over the information which gets generated and put into a marketing kit. After the target markets are identified, the process 400 identifies (at 430) venues within each target market and then filters (at 435) the identified venues within each target market to derive recommended venues. In some embodiments, the venues are chosen by an analysis that determines good candidate venues, and then ranks the good candidate venues to identify the best candidate venues for the user to contact. In some embodiments, the algorithm parses through different searches to weigh and qualify which contacts represent the best chance of most sales/new market entry. In some embodiments, the algorithm performs an analysis to filter details about the user's target markets, using keywords the user inputs to find venues in cities and contacts at these venues. For example, keywords are filtered through to find specific venue suggestions, such that if one of the keywords is women's clothing, then filtering of the venues includes filtering out the venues not associated with selling womens clothing. This would result in a recommended list of venues such as those filtered venues that sell women's clothing and perhaps women's organizations, etc. Each could then be sent a different message, based on the filtering that was performed to derive the recommended venues.

After recommending the venues, the process 400 of some embodiments generates (at 440) marketing suggestions tailored to each target market and/or each recommended venue. The marketing suggestions provided by the process 400 may be provided in connection with the transactional marketing system 200 or any of the other process described in this specification (such as the process for generating a marketing kit 100, the detailed process 200, and the process 300).

Average users are provided with transactional marketing suggestions since typical users do not generally have time or experience to think of all the potential markets or marketing methods to get their product or service in front of the right audience. In order to do this, the process 400 of some embodiments uses an algorithm that searches and expands on the key words provided by the user, or retrieved a web resource (such as the user's product or service homepage on the web), or simply through the product or service description page. For example, if a keyword is "dogfood," the algorithm will find suggestions with "dog." The algorithm will then understand that the user is selling dogfood. Then the algorithm would find and qualify the search results. So if "dog" produces an animal rescue shelter and a supermarket in the target city, the algorithm would rank and qualify the venues. If the venue is a restaurant that sells "hot dogs" then this would not be a good marketing suggestion for the user who is selling dog food. In this way, the algorithm is able to rank the animal rescue shelter and the supermarket highly while eliminating the hot dog restaurant. Once this is done, the algorithm analyzes further what marketing message should be sent to each venue. The message that gets sent to the shelter might be a partnership where $2 dollars will be donated to the shelter for every bag of our user's dog food that they sell. The message to the supermarket might be that the user is offering a buy one, get one free promotion.

Next, the process 400 searches (at 445) for contacts associated with each recommended venue and/or target market. In some embodiments, the process 400 provides the user with the contacts that are within or proximate to their city, venue, or industry. Emails of the contacts and venues are provided along with other company info such as phone, address, revenue.

The process 400 of some embodiments then generates (at 450) a custom email message with the marketing message and a personalized message from the user to each contact. In some embodiments, the custom email includes all a custom biography for the user, along with general and/or detailed product or service information. As the user needs to send relevant marketing material to each of the venues along with an email, the process 400 of some embodiments automatically generates personal and/or company biography details. Then the process 400 generates the custom email messages. These are intended to be sent to the targeted contacts that are provided automatically when sent by the user's express direction. That is, the custom email message is generated, but ultimately, the user has the final say as to when or if such email is sent to any particular contact/venue.

Finally, the process 400 generates (at 455) a marketing kit that includes the identified target markets, the recommended venues, the marketing suggestions, and the contacts, and which allows for automatic transmission of the custom email with the marketing kit. In some embodiments, the marketing kit is automatically generated with the biography information, product or service description and details, and so forth as the user provides responses to these questions. Then the process 400 ends.

The ease at which a user may interact with the transactional marketing system to have a marketing kit generated for a product or service is a vast improvement over other options in the field. For instance, existing sales, marketing, customer relationship management (CRM), and/or analytical software does not offer such business intelligence, nor are they transactional. In most cases, the existing options require a lot of interaction from the user, leaving the user to ponder all of the unknowns about marketing. The existing options also do not offer marketing suggestions or provide contacts, leaving users to upload their own contacts and come up with their own marketing mix, then craft their own marketing messages and send to contacts themselves.

In contrast, the process for generating a marketing kit with marketing suggestions tailored to target markets and venues 400 (as well as the process for generating a marketing kit 100, the transactional marketing system 200, and the process 300) does most of this challenging work on behalf of the user. For instance, embodiments of the processes and system of this disclosure automatically think of marketing ideas and strategies, and can execute them on behalf of the user. The processes and system also provide contacts, crafts the communications sent, uploads the marketing material automatically to the emails sent, and sends emails to contacts on behalf of the user. Furthermore, the process 400 finds new markets and contacts, provides business intelligence, thinks of marketing insights, implements marketing strategies, insights, and practices for the user, and provides logical analysis by way of an analytics engine that performs one or more algorithms.

III. Premium Process for Generating a Premium Marketing Kit

While the transactional marketing system 100, the high level process for generating a marketing kit 200, and the detailed process for generating a marketing kit 300 described above demonstrate the ease with which a user may quickly market a product or service at one or more venues within one or more target markets, in some instances, the user may be interested in providing additional enhanced details that focus on key aspects of the product or service to market. In this section, a process is described for generating a premium marketing kit with market research performed in relation to the product or service, such that one or more aspects of the product or service is enhanced by the market research when included in the premium marketing kit.

Specifically, in at least one embodiment, a process for generating a premium marketing kit that includes market research in the premium marketing kit includes steps for receiving target demographics, generating a marketing message, identifying target markets based on the target demographics, identifying venues in each target market, filtering the identified venues to derive recommended venues, compiling a list of features related to a product or service to be marketed, generating a survey to send to a list of key contacts, receiving survey responses from one or more of the key contacts, incorporating survey responses into a marketing message for promoting the product or service, searching web resources for relevant research information pertaining to the product or service, parsing the relevant research information to find key points that may help sell the product or service, generating a relevant research report with the key points highlighted, generating a custom email message with the marketing message, the list of features, the key points, and additional customized information, generating a marketing kit with the identified target markets, the recommended venues, the marketing suggestions, and the contacts at the recommended venues, and automatically sending the custom email message to the contacts at the recommended venues.

Figure 5:
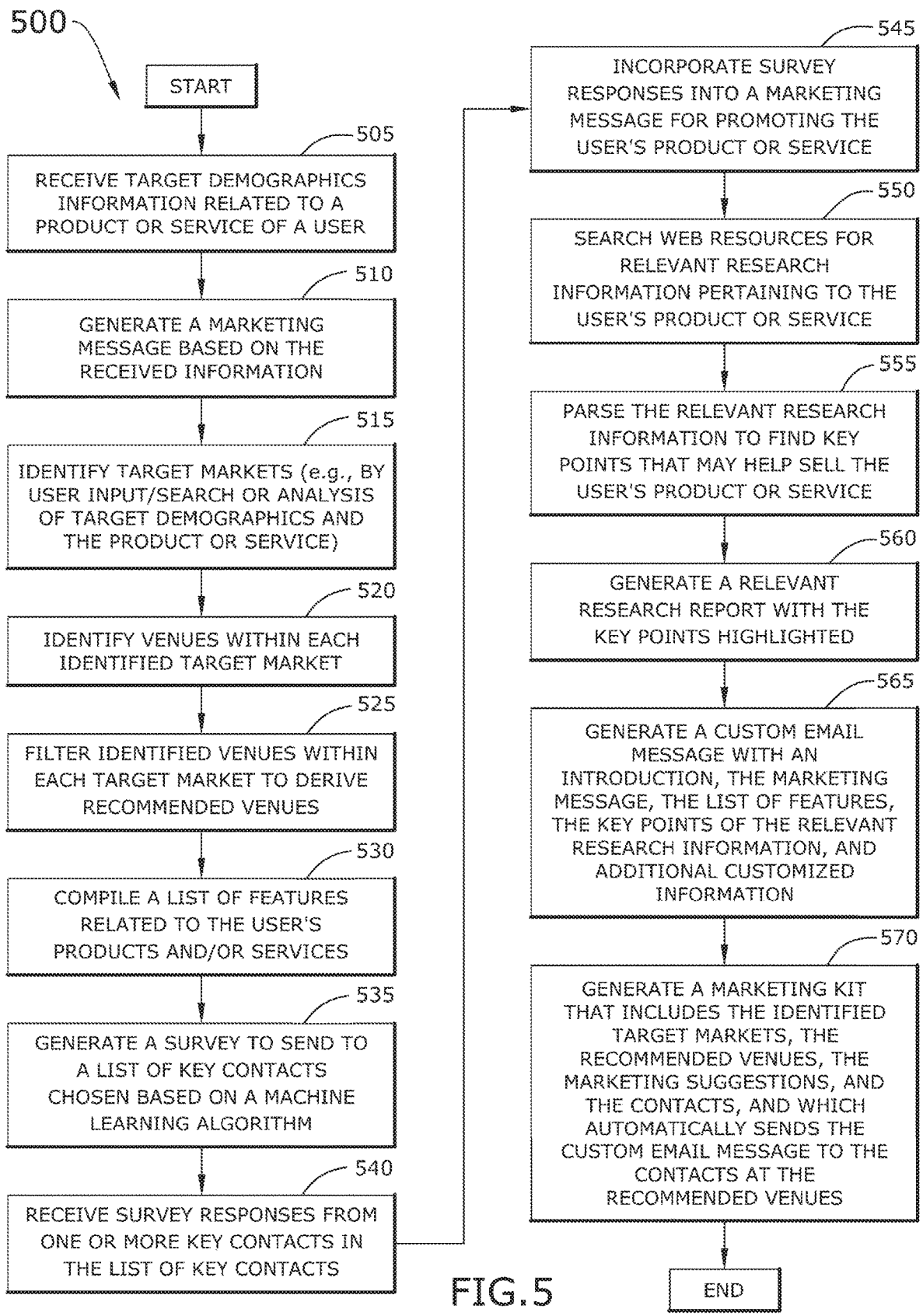
FIG. 5 conceptually illustrates a premium process in some embodiments for generating a premium marketing kit that includes market research in the premium marketing kit.

By way of example, FIG. 5 conceptually illustrates a premium process 500 for generating a premium marketing kit that includes market research in the premium marketing kit. As in the processes described above, the premium process 500 for generating a premium marketing kit includes steps for receiving (at 505) target demographics information related to a product or service to market, generating (at 510) a marketing message based on the received information, identifying (at 515) target markets, identifying (at 520) venues within the target markets, and filtering (at 525) the venues to derive a set of recommended venues.

In some embodiments, the premium process 500 next compiles (at 530) a list of features related to the product or service the user intends to market. Features include any additional features or aspects beyond the basic information that is received earlier in support of a basic description of the product or service. For instance, certain advantages may be described in relation to features of a product, or certain distinctions of a product over other products in the field.

Next, the premium process 500 generates (at 535) a survey to send to a list of key contacts. In some embodiments, the survey is generated with the list of compiled features of the product or service (e.g., compiled at 530). After the survey is generated, the survey is sent to the key contacts. In some embodiments, the list of key contacts are chosen by a machine learning algorithm. In some embodiments, the algorithm determines the best new markets and from these markets identifies the key contacts, in relation to the information already provided.

In some embodiments, the premium process 500 receives (at 540) survey responses from one or more of the key contacts. In some embodiments, the premium process 500 evaluates and/or measures survey responses. Next, the premium process 500 incorporates (at 545) survey responses into a marketing message for promoting the product or service. In some embodiments, multiple new marketing messages with one or more of the incorporated survey responses are automatically generated for the user. For instance, the premium process 500 may evaluate the survey responses and include only responses with high praise in a message, while in another marketing message, high praise survey responses are included along with a balanced set of average or negative survey responses.

Next, the premium process 500 of some embodiments searches (at 550) the web and finds relevant research reports or other relevant information pertaining to the user's product or service. In some embodiments, the premium process 500 then parses (at 555) the research reports and information to find key points that may help to sell the user's product or service. Next, the premium process 500 generates (at 560) a relevant research report with key points highlighted. The research report includes important features the user's product or service features, combined in an email and sent to contacts. This is important by itself to find what features are important to buyers, and it is done automatically by the premium process 500. In some embodiments, the premium process 500 also measures the survey responses and incorporates them into custom marketing emails and research reports, thereby increasing the chance of a sale. The research reports are also provided from online research to help provide the user with data to close the sale.

In some embodiments, the premium process 500 generates (at 565) a custom email message with an introduction, the marketing message, the list of features, the key points of relevant research information, and additional customized information. As such, the key points are highlighted as selling points when the email is sent to contacts. Thus, when the key points are highlighted in the email message, the user may access the listing of key points to use as selling point during (for example) follow-up calls with the contacts.

Finally, the premium process 500 generates (at 570) a marketing kit with the identified target markets, the recommended venues, the marketing suggestions, the contacts, the highlight key points of relevant research information, and presents the custom email to the user for transmission to contacts at direction and control of the user. For example, custom emails are sent automatically upon the user selecting an option to send the emails to selected contacts at the venues. These emails are sent on behalf of the user with custom email content, and bio and product description. In some embodiments, the user is reminded a short time later to follow up with each venue and/or contact who was emailed. In some embodiments, the premium process 500 provides a short script regarding the email message and why the key points of relevant research were provided, all to assist the user in making a sale of the product or service. The premium process 500 then ends.

IV. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
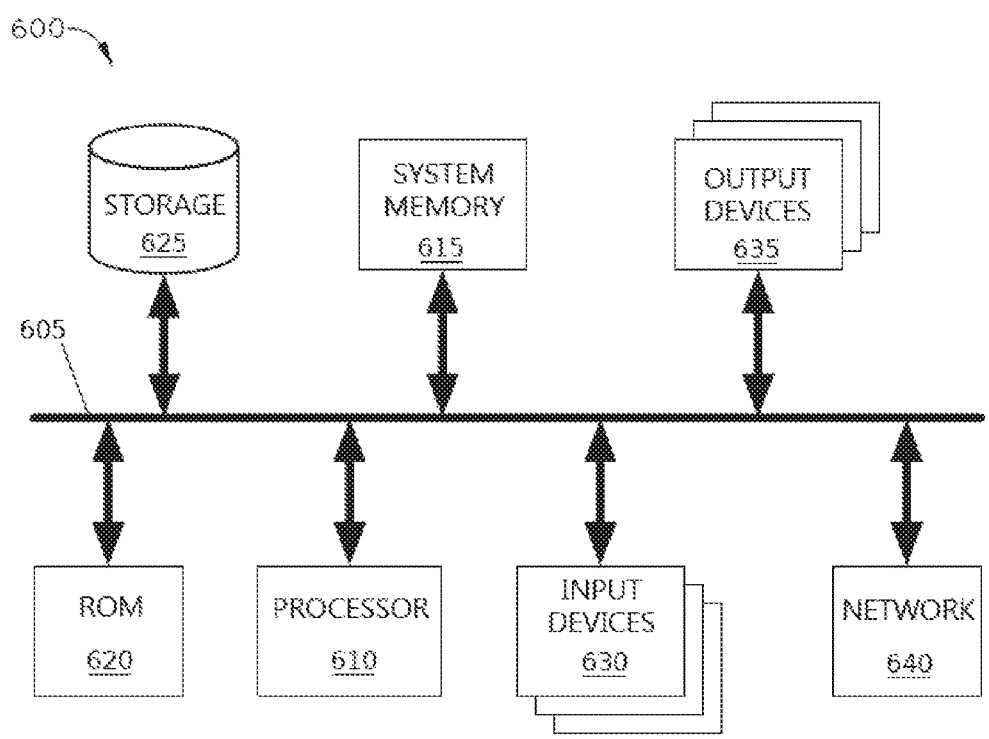
FIG. 6 conceptually illustrates an electronic system with which some embodiments of the invention are implemented.

FIG. 6 conceptually illustrates an electronic system 600 with which some embodiments of the invention are implemented. The electronic system 600 may be a desktop computer, laptop computer, server, mobile computing device (e.g., tablet computing device, personal digital assistant (PDA) device, etc.), mobile phone, PDA, or any other sort of electronic device. Such an electronic system includes various types of computer readable media and interfaces for various other types of computer readable media. Electronic system 600 includes a bus 605, processing unit(s) 610, a system memory 615, a read-only 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only 620, the system memory 615, and the permanent storage device 625.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 625.

Other embodiments use a removable storage device (such as a floppy disk or a flash drive) as the permanent storage device 625. Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor needs at runtime. In some embodiments, the invention's processes are stored in the system memory 615, the permanent storage device 625, and/or the read-only 620. For example, the various memory units include instructions for processing appearance alterations of displayable characters in accordance with some embodiments. From these various memory units, the processing unit(s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards and pointing or cursor control devices. The output devices 635 display images generated by the electronic system 600. The output devices 635 include printers and display devices, such as cathode ray tubes (CRT) or liquid crystal displays (LCD). Some embodiments include a touchscreen that functions as both an input and output device.

Finally, as shown in FIG. 6, bus 605 also couples electronic system 600 to a network 640 through a network adapter (not shown). In this manner, the computer can be a part of a network of computers (such as a local area network ("LAN"), a wide area network ("WAN"), or an Intranet), or a network of networks (such as the Internet). Any or all components of electronic system 600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1, 3, 4, and 5 conceptually illustrate processes. The specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. A non-transitory computer readable medium storing a program which, when executed by a processor of a computing device, provides market recommendations upon user request and generates a marketing kit for a user with a product to market, said program comprising sets of instructions for:
   receiving information about a product a user intends to market and sell;
   receiving target demographics information related to the product;
   determining whether target market recommendations are requested by the user;
   identifying a set of target markets based on user input when target market recommendations are not requested by the user, wherein the user input comprises at least one market searchable characteristic from a plurality of market characteristics comprising a city name and a zip code;
   identifying the set of target markets based on an analysis of target demographics and the product when target market recommendations are requested by the user, wherein the set of target markets comprises markets in which to market and sell the product;
   identifying venues, by way of a backend venue and contact discovery server that searches a venue and contact database, in each target market of the identified set of target markets to market and sell the product;
   filtering the identified venues, by the backend venue and contact discovery server, in each target market according to suitable conditions for marketing and selling the product at a venue;
   providing the filtered identified venues to a marketing kit generation server by way of a web server computer that is communicably connected to both the backend venue and contact discovery server and the marketing kit generation server;
   deriving a set of recommended venues, by the marketing kit generation server, based on the filtered identified venues in each target market of the identified set of target markets;
   generating a marketing message that highlights the received information about the product the user intends to market and sell and which is customized, by the marketing kit generation server, based on the received target demographics information;
   generating a custom email message with the marketing message to be electronically sent to contacts at the derived set of recommended venues by the direction and control of the user interacting with the marketing kit generation server with a client computing device that connects to the marketing kit generation server indirectly through a marketing kit generation online service that is hosted by the web server computer; and
   generating a marketing kit by the marketing kit generation server that processes content kit creation in connection with a publishing kit database, said marketing kit comprising the identified target markets, the recommended venues, and the custom email message with the marketing message, wherein the custom email message with the marketing message is electronically sent to select contacts at the recommended venues by the direction and control of the user.

2. The non-transitory computer readable medium of claim 1, wherein the product is a book and the user is an author of the book.

3. The non-transitory computer readable medium of claim 2, wherein the set of instruction for generating the marketing kit comprises a set of instructions for generating a book marketing kit.

4. The non-transitory computer readable medium of claim 2, wherein the identified target markets comprise cities with large populations of readers.

5. The non-transitory computer readable medium of claim 2, wherein the set of recommended venues comprise a set of book stores.

6. A non-transitory computer readable medium storing a program which, when executed by a processor of a computing device, generates a premium marketing kit with market research and marketing suggestions for a user to market a commercial offering, said program comprising sets of instructions for:
   receiving user authentication credentials of a user by way of a client computing device connecting to a web server computer over the Internet;

performing user authentication verification by the web server computing device in connection with a user and payment database that stores valid user account credentials;

receiving, by the web server and provided to a marketing kit creation server, biographical information transmitted by the client computing device, said biographical information about the user and a commercial offering of the user that the user intends to market, wherein the commercial offering comprises one of a product and a service;

receiving, by the web server and provided to the marketing kit creation server, detailed information about the commercial offering;

receiving, by the web server and provided to the marketing kit creation server, target demographics information in relation to an intention by the user to market and sell the commercial offering;

generating, by the marketing kit creation server, a marketing message based on the biographical information, the detailed information about the commercial offering, and the target demographics information;

identifying, by a venue and contact discovery server in connection with a venue and contact database, a set of target markets to market and sell the commercial offering of the user;

identifying, by the venue and contact discovery server in connection with the venue and contact database, venues in each target market to market and sell the commercial offering of the user;

deriving, by the venue and contact discovery server in connection with the venue and contact database, a set of recommended venues by filtering the identified venues in each target market according to suitable conditions for marketing and selling the commercial offering;

generating, by the venue and contact discovery server, marketing suggestions tailored to each target market and each recommended venue;

searching, by the venue and contact discovery server, for contacts in the venue and contact database which are associated with each recommended venue and target market;

compiling a list of features related to the commercial offering of the user;

choosing a plurality of survey contacts to add to a list of key survey contacts;

generating a survey to send to the list of key survey contacts;

receiving survey responses from one or more survey contacts in the list of key survey contacts;

incorporating the received survey responses into the marketing message to promote the commercial offering of the user;

searching online resources for information pertaining to the commercial offering;

identifying key points for selling the commercial offering of the user, wherein the key points are identified among relevant information found while searching online resources for information pertaining to the commercial offering;

generating a research report with the key points for selling the commercial offering of the user listed and highlighted;

generating, by the marketing kit creation server, a custom email message with an introduction, the marketing message, the list of features of the commercial offering, and the key points for selling the commercial offering, wherein the custom email message is generated to electronically send by the direction and control of the user to the contacts at the recommended venues; and generating, by the marketing kit creation server, a marketing kit comprising the identified target markets, the recommended venues, the marketing suggestions, the contacts, and the custom email message, wherein the custom email message is electronically sent to select contacts at the recommended venues by the direction and control of the user.

7. The non-transitory computer readable medium of claim 6, wherein the marketing suggestions comprise a set of marketing methods to get the commercial offering marketed to an audience suitable to receive marketing information about the commercial offering.

8. The non-transitory computer readable medium of claim 7, wherein the marketing suggestions are based on searching for key words associated with the commercial offering.

9. The non-transitory computer readable medium of claim 8, wherein the key words comprise one or more of user-provided input with the key words, words retrieved from a web page resource associated with the commercial offering of the user, and words retrieved from a commercial offering description web page resource.

10. The non-transitory computer readable medium of claim 7, wherein the commercial offering comprises a service that is promoted by the user.

11. The non-transitory computer readable medium of claim 6, wherein the client computing device comprises a mobile computing device of one of an author and a promoter.

12. The non-transitory computer readable medium of claim 6, wherein the client computing device comprises a content publisher computing device of an independent publisher.

13. The non-transitory computer readable medium of claim 6, wherein the set of instructions for searching for contacts comprises a set of instructions for using machine learning by the venue and contact discovery server to search and filter contacts in both the venue and contact database and in external resources accessed over the Internet which are associated with each recommended venue and target market.

14. The non-transitory computer readable medium of claim 13, wherein the external resources accessed over the Internet comprise one or more of a set of web sites and a set of press releases, wherein the machine learning is used to search and filter contacts by identifying alternative email addresses described in the web sites and press releases for the contacts.

15. The non-transitory computer readable medium of claim 13, wherein one or more algorithms of an analytics engine are used in connection with the machine learning to search and filter contacts.

* * * * *